(12) United States Patent
Fu et al.

(10) Patent No.: US 8,788,811 B2
(45) Date of Patent: *Jul. 22, 2014

(54) SERVER-SIDE KEY GENERATION FOR NON-TOKEN CLIENTS

(75) Inventors: Christina Fu, Saratoga, CA (US); Andrew Wnuk, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/790,354

(22) Filed: May 28, 2010

(65) Prior Publication Data

US 2011/0296172 A1     Dec. 1, 2011

(51) Int. Cl.
*H04L 9/32* (2006.01)
*H04L 9/08* (2006.01)
*H04L 29/06* (2006.01)

(52) U.S. Cl.
CPC ......... *H04L 9/3268* (2013.01); *H04L 2463/062* (2013.01); *H04L 9/0822* (2013.01); *H04L 29/06775* (2013.01); *H04L 29/06047* (2013.01)
USPC ........... 713/156; 713/153; 713/154; 713/155; 713/157; 713/158; 713/173; 713/175; 713/176; 713/177; 726/2; 726/10; 726/18; 726/21; 380/42; 380/43; 380/44; 380/277; 380/278; 380/279; 380/280; 380/281; 380/282; 380/283; 380/284; 380/285; 380/286

(58) Field of Classification Search
CPC ...................................................... H04L 9/3268
USPC ........ 713/155–158, 173, 175–177; 726/2, 10, 726/18, 21; 380/277–286, 42–44
See application file for complete search history.

(56) References Cited

U.S. PATENT DOCUMENTS

| | | | |
|---|---|---|---|
| 7,069,441 B2 * | 6/2006 | Balaz et al. ................... | 713/175 |
| 8,365,299 B2 * | 1/2013 | Sakai et al. ..................... | 726/27 |
| 2001/0036273 A1 * | 11/2001 | Yoshizawa .................... | 380/247 |
| 2003/0154376 A1 * | 8/2003 | Hwangbo ..................... | 713/173 |
| 2003/0188201 A1 * | 10/2003 | Venkataramappa .......... | 713/202 |
| 2007/0280483 A1 | 12/2007 | Fu et al. | |
| 2007/0288745 A1 * | 12/2007 | Kwan et al. ................... | 713/155 |
| 2008/0019526 A1 | 1/2008 | Fu et al. | |
| 2008/0022086 A1 | 1/2008 | Ho et al. | |
| 2008/0022088 A1 | 1/2008 | Fu et al. | |
| 2008/0022121 A1 | 1/2008 | Fu et al. | |
| 2009/0086977 A1 * | 4/2009 | Berggren ...................... | 380/279 |
| 2009/0119149 A1 * | 5/2009 | Leonard et al. .................... | 705/9 |
| 2010/0111300 A1 * | 5/2010 | Kido et al. ....................... | 380/46 |
| 2010/0161984 A1 * | 6/2010 | Pauker et al. ................. | 713/168 |

OTHER PUBLICATIONS

"PKCS 12 v1.0: Personal Information Exchange Syntax", *RSA Laboratories, a Division of RSA Data Security*, pp. 1-23, (Jun. 24, 1999).

* cited by examiner

*Primary Examiner* — David Pearson
*Assistant Examiner* — Josnel Jeudy
(74) *Attorney, Agent, or Firm* — Lowenstein Sandler LLP

(57) ABSTRACT

A method and system for server-side key generation for non-token clients is described.

22 Claims, 5 Drawing Sheets

CERTIFICATE PROFILE

Use this form to submit the request.

Certificate Profile – Enroll Certificate with Server-Side Key Generation

This certificate profile is for enrolling certificates with server-side private key generation

Inputs

Password to Encrypt Private Key for Retrieval
- Password for Private Key Retrieval

[SUBMIT]

FIG. 5

SERVER-SIDE KEY GENERATION FOR NON-TOKEN CLIENTS

TECHNICAL FIELD

Embodiments of the invention relate to the field of identity management systems, and more particularly, to server-side key generation for non-token clients of identity management systems.

BACKGROUND

Identity management systems are information systems that support the management of identities. In particular, an identity management system establishes the identity of a subject or an object by linking a name (or number) with the subject or object. The identity management system may also describe the identity, for example, by assigning one or more attributes applicable to the particular subject or object to the identity. The identity management system may also modify the identity, such as by linking a new or additional name, or number, with the subject or object and/or change one or more attributes applicable to the particular subject or object. The identity management system can record and/or provide access to logs of activity by the identity.

One of the cornerstones of establishing a secure network environment is making sure that access is restricted to people who have the right to access the network. This access is allowed when the user can authenticate to the identity management system, meaning the user can verify his identity. The authentication may be managed by a public key infrastructure (PKI), such as implemented by a certificate system. For PKI, users and machines may present digital certificates to verify their identity. A digital signature is a mathematical representation of a message, using public key cryptography, which identifies the originator of the message, in a non-forgeable manner. Public key cryptography requires the use of two mathematically related keys—a public key and a private key (collectively referred to as a key pair). The private key is kept private by a single owner, and is not distributed to anyone else. The owner uses his or her private key, in conjunction with cryptographic algorithms, to digitally sign a message. The public key is made public, and can be used by anyone to verify the digital signature on a message. The fact that these two keys are mathematically related ensures that only a single private key can generate a digital signature that is verifiable by the corresponding public key, making the digital signature unforgeable. Public key encryption also allows protection of the confidentiality and integrity of a message or file. Using public key encryption the message or file is encrypted using the public key, which can only be decrypted using the private key. These asymmetric key algorithms allow one key to be made public while retaining the private key in only one location. A digital certificate, commonly referred to as a certificate, is an electronic document used to identify an individual, a server, a company, or another type of entity and to associate that identity with a public key. The digital certificate binds a person's identity to his or her public key, and consequently, to his or her private key, and may be used to verify digital signatures. Digital certificates and digital signatures then provide the foundation for secure transactions over a network, such as the Internet.

Certificate authorities (CAs) validate identities and issue certificates. CAs can be either independent third parties or organizations running their own certificate-issuing server software, such as a certificate system. Before issuing a certificate, a CA must confirm the user's identity with its standard verification procedures. The certificate issued by the CA binds a particular public key to the name of the entity identified by the certificate. In addition to the public key, the certificates include the name of the entity it identifies, an expiration date, and the name of the CA that issued the certificate.

These certificates can be stored on tokens, also referred to as smart cards, smart card tokens, security tokens, hardware tokens, hard token, USB tokens, cryptographic tokens, key fobs, or other hardware security modules (HSMs). The token may be a physical device that an authorized user of computer services is given to ease authentication. Tokens can store a certificate that is used for authenticating the identity of the owner. For example, when a user inserts a smart card into a system, the smart card presents the certificates to the system and identifies the user so the user can be authenticated over the network.

In a conventional system, a token client has a client application, such as an enterprise security client (ESC), which manages the token, and interacts with a token processing system (TPS) of a certificate system. The TPS, which acts as a registration authority (RA) of the CA, coordinates the enrollment process, and acts as a gateway between the token client and the certificate system. The TPS communicates with a token key service (TKS), which maintains master keys for tokens, and may store symmetric keys associated with the token. These keys may be derived from a single master key combined with smart card serial number or card universal identification (CUID) number. The TPS may also communicate with a data recovery manager (DRM), which maintains a database of encrypted private keys for recovery purposes. The DRM can archive the private key for later recovery. Archiving private keys offers protection for users, and for information, if that key is ever lost. When information is encrypted by the public key, the corresponding private key must be available to decrypt the information. If the private key is lost, the data cannot be retrieved. A private key can be lost because of a hardware failure or because the key's owner forgets the password or loses the hardware token in which the key is stored. The TPS also communicates with the CA to issue a certificate in response to the public key information and certificate enrollment request received from the token client. Examples of this conventional system are described in U.S. Patent Publication No. 2008/0022121, U.S. Patent Publication No. 2008/0022088, and U.S. Patent Publication No. 2008/0019526, all filed Jun. 6, 2006 and commonly assigned to the assignee of the present application.

Although most enrollment requests for certificates for tokens include a client-side generated public key, there are times when the token needs a new encryption certificate, or the private key needs to be recovered for the token or generated for a new token when the token has been lost or damaged. In such cases, the TPS sends a request to the TKS on behalf of the token to replace the manufacturer-installed symmetric keys with server-generated keys, derived from the master key, and then submits the public key with the enrollment request to the CA to be issued. Once the CA approves the enrollment request, the TPS sends the certificate and the private key to the client to be stored on the token. These conventional systems may be limited to generating key pairs for token clients, and require a TPS to operate as a gateway between the security client that manages the token of the token client and the components of the certificate system, such as the TKS, DRM, and CA. The conventional certificate systems are not configured to handle server-side key generation for non-token clients.

BRIEF DESCRIPTION OF THE DRAWINGS

The present invention will be understood more fully from the detailed description given below and from the accompa

FIG. 5 illustrates an exemplary web page presented to a user by the certificate system containing a certificate enrollment form for server-side key generation according to one embodiment.

DETAILED DESCRIPTION

Figure 1:
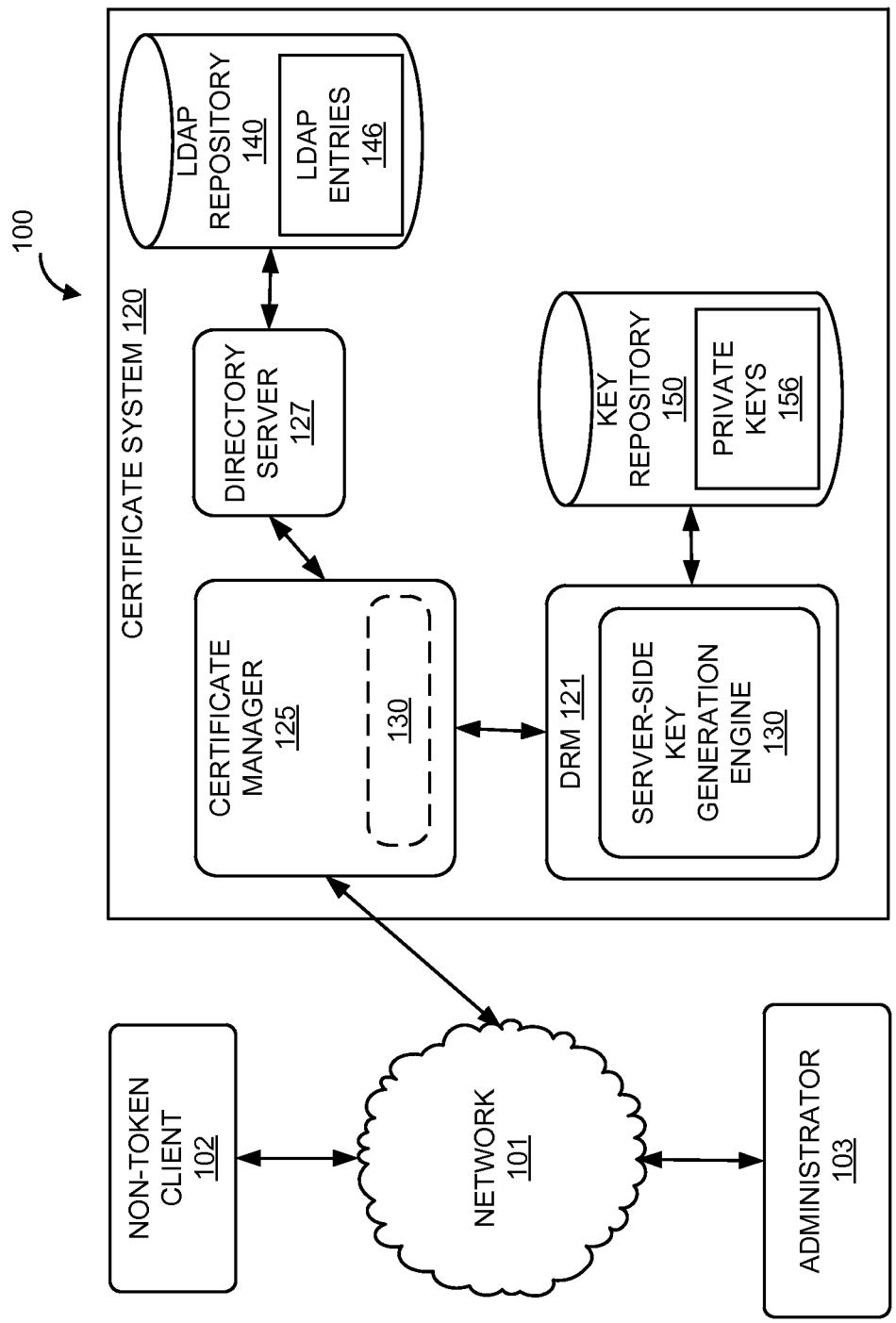
- FIG. 1 is a block diagram of exemplary system architecture in which embodiments of a certificate system, having a server-side key generation engine, may operate.

A method and system for server-side key generation for non-token clients is described. In one embodiment, a method includes receiving from a requester a certificate enrollment request for a digital certificate for a non-token client. When the method determines that the enrollment request includes a server-side key indicator, the method generates a key pair, including a private key and a public key for the digital certificate, encrypts the private key, and delivers the encrypted private key to the requester. In one embodiment, the method encodes the private key using a password. For example, the requester may provide the password in connection with the enrollment request, such as via a user interface to the requester. In this embodiment, the password and/or enrollment request is encoded using a public key of transport key pair of the DRM. Since the password is encrypted using the transport key, the method can encrypt the private key using the password for secure delivery to the requester. In another embodiment, a method provides a user interface to an agent of the CA to receive the password from the agent and encrypts the private key with the agent-provided password. Since the password is not received from the requester, the agent needs to manually notify the requester of the password to allow the requester to decrypt the encrypted private key after retrieval from the CA. Since the private key is encrypted, for example, using the password, the method can limit access to the private key to those who know the password (e.g., agent of CA and requester). In this case of receiving a password from the requester that has been encrypted using the transport key, access to the private key can be limited to the requester, since, in this case, the agent does not have the user's password.

As described above, the client typically generates a key pair, including a public key and a private key and sends the public key to the CA as part of an enrollment request, keeping the private key stored on the client. Instead of receiving the client-generated public key, the embodiments described herein receive the enrollment request with a server-side key indicator to generate a key pair for the digital certificate. When the CA determines that the enrollment request includes a server-side key indicator, the CA can generate a key pair, including a private key and a public key, which at that point are unknown to the client. Otherwise, the enrollment request can include the public key and be processed according to conventional methods to approve or reject the enrollment request. Conventionally, token clients required both the TPS and TKS to replace the manufacturer-installed symmetric keys installed on a token with server-generated keys. After the TPS receives the sever-generated keys, the TPS submits an enrollment request with the public key to the CA for approval, and upon approval sends the approved certificate and private key back to the client to be stored on the client. Unlike conventional token clients, the embodiments described herein can receive an enrollment request directly at the CA without the TPS acting as a gateway between the client and the CA. Also, unlike conventional non-token clients, the embodiments described herein receive enrollment requests without a public key, rather a server-side key indicator to generate a key pair. use of the TPS and TKS, generate the key pair, and securely deliver the private key to the client requesting the certificate. These conventional systems may be limited to generating key pairs for token clients, and require a TPS to operate as a gateway between the security client that manages the token of the token client and the components of the certificate system, such as the TKS, DRM, and CA. The conventional certificate systems are not configured to handle server-side key generation for non-token clients.

Embodiments of the present invention provide an improved certificate system that allows server-side key generation for non-token clients. Instead of receiving the public key from the requester in connection with the enrollment request, the certificate system itself generates the key pair for the non-token client. The certificate system allows the key pair, and in particular, the private key to be archived immediately for later retrieval, such as in the case of key recovery. By generating the key pair, the certificate system can reduce the amount of time consumed to archive the private key, since the private key can be archived immediately after the private key is generated at the certificate system. Using a password, whether provided by the requester or the agent, the certificate system can deliver the private key to the requester securely.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "encrypting," "delivering," "presenting," "signing," "publishing," "approving," "authenticating," "archiving," "processing," "providing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of a certificate system 120, having a server-side key generation engine 130, may operate. The architecture 100 includes a non-token client 102, an administrator workstation 103 and a certificate system 120, each coupled to the network 101 that communicates any of the standard protocols for the exchange of information. The non-token client 102 may be any type of device that stores or uses the digital certificate (e.g., encryption certificate) without the digital certificate being stored on a hardware token, smart card, or other physical hardware security modules (HSMs). Certificates for non-token clients 102 are sometimes referred to as soft tokens, since they do not use a hardware security device.

The network 101 may be a Local Area Network (LAN) and may be incorporated into the same physical or logical system, or different physical or logical systems. Alternatively, the certificate system 120 and non-token client 102 may reside on different LANs that may be coupled together via the Internet but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the certificate system 120, administrator workstation 103, and the non-token client 102.

The certificate system 120 may be hosted on one or more machines including one or more server computers, gateways or other computing systems. In one embodiment, the certificate system 120 resides on multiple servers, including a CA server that hosts the certificate manager 125, and the end users and/or agents on the non-token client 102 can interact with the certificate system 120 via web browser applications on the non-token client 102. It should be noted that various other network configurations can be used including, for example, hosted configurations, distributed configurations, centralized configurations, etc. The certificate system 120 includes various certificate system subsystems, including a certificate manager 125, a data recovery manger (DRM) 121 (also referred to as a key recovery authority), and a directory server 127, each of which is described in more detail below.

In one embodiment, the DRM 121 includes the server-side key generation engine 130. In one embodiment, the server-side key generation engine 130 of the DRM 121 is coupled with a key repository 150, which stores private keys 156 for later retrieval for recovery purposes. For example, when data is stored in encrypted form, the user uses the private key, corresponding to the public key used to encrypt the data, in order to decrypt and read the encrypted data. If the private key is lost, the data cannot be retrieved. A private key can be lost because of a hardware failure or because the key's owner forgets the password or loses the software token in which the key is stored, for examples. Similarly, encrypted data cannot be retrieved if the owner of the key is unavailable, for example, the owner of the key has left the organization that owns the data. The DRM 121 stores the private keys, or alternatively, the key pairs, so that a new, identical certificate can be generated based on recovered keys, and all the encrypted data can be accessed even after a private key is lost or damaged. In one embodiment, the server-side key generation engine 130 encrypts the private key using a private storage key (i.e., a private key used for encrypting the private keys 156 stored in the key repository 150). The DRM 121 may be the only device that has the private storage key in order to retrieve the corresponding private key 156 when a key recovery request is approved. In another embodiment, the private keys 156 can be stored in the LDAP repository 140, and the server-side key generation engine 130 communicates with the directory server 127 to archive and access private keys stored in the LDAP repository 140. Alternatively, other types of database systems can be used to store the private keys.

In other embodiments, the server-side key generation engine 130 may be implemented in other components of the certificate system 120, such as, in the certificate manager 125 (depicted as a hashed box in FIG. 1), for example. However, it should be noted that implementing the server-side key generation engine 130 on the DRM 121 may be more convenient for key archival purposes than on the certificate manager 125; in other embodiments, the CA 125, DRM 121, and server-side key generation engine 130 may be implemented together. The operations of the server-side key generation engine 130 are described in more detail below with respect to FIGS. 2-5. In other embodiments, the certificate system 120 may include other certificate system subsystems as well.

The certificate manager 125 may operate as a CA that can issue, renew, revoke, and publish a wide variety of certificates, for servers, for users, for routers, for other subsystems, and for file or object signing. The certificate manager 125, also referred to as a CA server, can be implemented as software, hardware, firmware or any combination thereof. The certificate manager 125 is the core of a CA's Public Key Infrastructure (PKI). The PKI is a set of hardware, software, people, policies, and procedures needed to create, manage, distribute, use, renew, recover, and revoke digital certificates. The certificate manager 125 can also compile and publish certificate revocation lists (CRLs).

Figure 2:
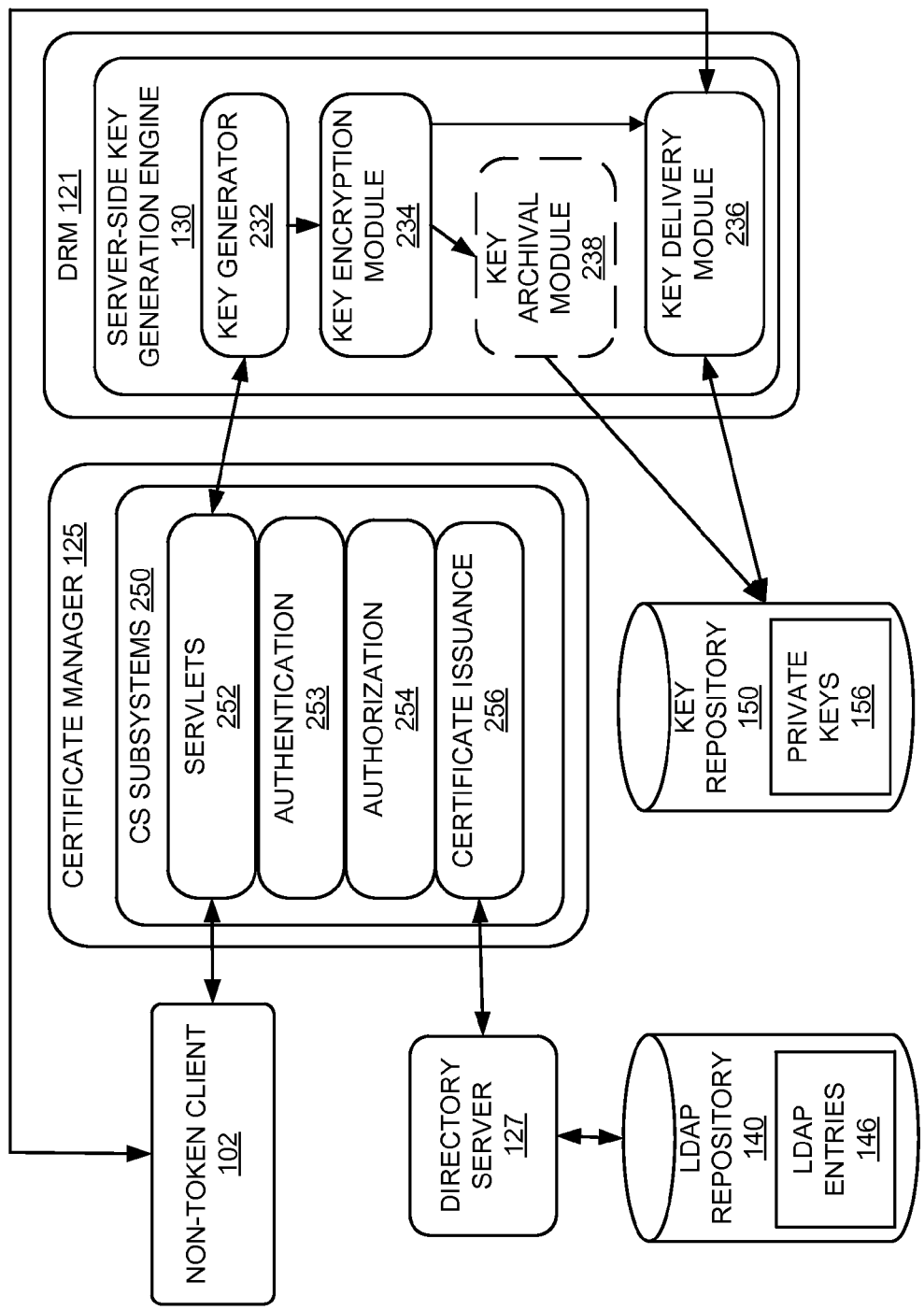
FIG. 2 is a block diagram of one embodiment of the server-side key generation engine of the DRM of FIG. 1.

The certificate system 120 includes a CA database. The CA database may be implemented, for example, using various types of database technologies. In one embodiment, as depicted in FIGS. 1 and 2, the certificate system 120 implements the CA database using the directory server 127 that manages Lightweight Directory Access Protocol (LDAP) entries 146 stored in the LDAP repository 140. The directory server 127 may be hosted by one or more machines including one or more server computers, gateways or other computing systems. In some embodiments, the LDAP entry 146 may contain along with the original certificate, the certificate profile used to enroll the original certificate, its public key, the subject DN, the enrollment certificate request, the original certificate's extension, etc., for example. The certificate profile includes a set of rules concerning the issuing of a certificate by the certificate manager 125, for example, the kind of content that is required to submit the request, the way the request is processed and approved (authenticated and authorized), the information that is included in the certificate content, and how long the certificate is valid. In one embodiment, one of the certificate profiles is a server-side key generation certificate profile that allows the certificate manager 125 to receive an enrollment request without a public key and to determine that the enrollment request includes a server-side key indicator. When the certificate manager 125 determines that the enrollment request includes the server-side key indicator, the certificate manager 125 can generate the key pair itself and encrypt the private key for delivery to the requester. Also, other certificate profiles may be used that requires that the enrollment request include a public key as part of the enrollment request. In other embodiments, the LDAP entry 146 may contain, along with the digital certificate, an original enrollment profile used to enroll the original certificate, its public key, the subject Distinguished Name (DN), the enrollment request for the original certificate, the original certificate's extension, for example. The original certificate request entry may also contain the original validity period of the certificate and the grace period for renewing the certificate. The grace period is the time before and after the expiration date when renewal is allowed. Alternatively, the CA database may use technology other than LDAP to store records of digital certificates in the CA database.

In another embodiment, the CA database, implemented using the directory server 127 and the LDAP repository 140, can operate as a key repository to store the archived private keys for later retrieval, as described above.

The non-token client 102 and administrator workstation 103 may each be a personal computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device. In one embodiment, an administrator on the administrator workstation 103 configures the server-side key generation engine 130 to add or update a certificate profile corresponding to the server-side key generation. The non-token client 102 and administrator workstation 103 may each provide web-browsing capabilities to render images, documents, etc., in a web browser using uniform resource locators (URLs) or links specified by the administrator (e.g., by activating a link). The web browser on the administrator workstation 103 allows an administrator to access an administrator console provided by the certificate system 120. The administrator console can allow the administrator to configure the server-side key generation engine 130, and/or create or modify certificate profiles stored in a data storage device of the certificate system 120 pertaining to the enrollment requests requiring server-side key generation. The administrator workstation 103 can use the management user interface (UI) for management of the certificates. In one embodiment, the administrator workstation 103 can access the management UI via a browser, in which case the UI is a web-based browser. In another embodiment, the administrator workstation 103 can access the management UI via a command line interface (CLI). The web browser on the non-token client 102 allows a user to request enrollment of a certificate with server-side client generation, such as described with respect to FIG. 5. The web browser may be used to allow the user to retrieve the private key, generated by the DRM, and/or the corresponding certificate.

FIG. 2 is a block diagram of one embodiment of the server-side key generation engine 130 of the certificate manager 125 of FIG. 1. The certificate manager 125 includes certificate system (CS) subsystems 250, and the server-side key generation engine 130 in the depicted embodiment. In the depicted embodiment, the server-side key generation engine 130 includes key generator 232, a key encryption module 234, a key delivery module 236, and a key archival module 238, which are each described in more detail below.

In one embodiment, the certificate manager 125 receives an enrollment certificate request for a digital certificate from the non-token client 102 that includes a server-side key indicator. The server-side key indicator indicates that the enrollment request does not include a public key and that the certificate manager 125 is to provide server-side generated keys to the requester. A requester may submit the enrollment certificate request if, for examples, the non-token client 102 does not support key generation, or a policy of the CA requires that the non-token client 102 obtain a new encryption certificate periodically and that the encryption certificate be archived. When the certificate manager 125 determines that the enrollment request includes the server-side key indicator, the certificate manager 125 can instruct the server-side key generation engine 130 to generate the key pair, to encrypt at least the private key of the key pair, and to deliver the encrypted private key to the requester. In one embodiment, the certificate manager 125 receives a password with the certificate enrollment request, and the server-side key generation engine 130 uses the password to encrypt the private key. In another embodiment, the certificate manager 125 receives the password before or after receiving the enrollment request. For example, the non-token client 102 may initiate the server-side key generation by sending a key generation request directly to the server-side key generation engine 130, and the server-side key generation engine 130 can prompt the user of the non-token client 102 to input a password for delivery of the private key. In one embodiment, the non-token client 102 encrypts the password using a public key of a transport key pair of the DRM 121. In this embodiment, the server-side key generation engine 130 decrypts the encrypted password using a private key of the transport key pair. For example, in one embodiment, the server-side key generation engine 130 presents to the non-token client 102, via the servlet 252, a user interface for the certificate enrollment request on a web page. The web page includes an input field to receive a password from a user of the non-token client 102. The server-side key generation engine 130 receives the certificate enrollment request and the password. In one embodiment, the non-token client 102 encrypts the password using a public key of a transport key pair of the DRM 121, and the server-side key generation engine 130 decrypts the password using a private key of the transport key pair, and provides the password to the encryption module 234.

In another embodiment, an agent of the certificate system 120 provides a password as user input to the server-side key generation engine 130. In one embodiment, the server-side key generation engine 130 provides a user interface to the agent to receive the password from the agent and provides the password to the key encryption module 234 to encrypt the private key. Since the password is not received from the requester, the agent needs to notify the requester of the password used to encrypt the private key. In one embodiment, the server-side key generation engine 130 creates a service task to notify the requester of the password and notifies the agent of the service task to manually notify the requester. For example, the service task can be placed on an agent's queue of actions to be taken. To complete the service task, the agent may call the requester to verbally communicate the password. Alternatively, the agent may use other communication means to notify the requester of the password.

When the certificate manager 125 determines that the enrollment request includes the server-side key indicator, the key generator 232 of the server-side key generation engine 130 generates a key pair, including a public key and a private key for the digital certificate. The key encryption module 234 receives the private key from the key generator 232 and encrypts the private key. In one embodiment, the key encryption module 234 encrypts the private key into an encrypted file using a password. As described above, in one embodiment, the password is received from the requester in connection with certificate enrollment request. In another embodiment, the password is received from an agent of the certificate system. In another embodiment, the key encryption module 234 encrypts the private key with the corresponding certificate in an encrypted file for delivery to the non-token client 102. In one embodiment, the encrypted file is a Public Key Cryptography Standard (PKCS) #12 file. PKCS is a family of Public-Key Cryptography Standards, published by RSA Laboratories. PKCS standards define a file format commonly used to store X.509 private keys with accompanying public key certificates, protected with a password-based symmetric key. In another embodiment, the encrypted file is a PFX file, developed by Microsoft Corporation. Alternatively, the key encryption module 234 can encrypt the private key using other file formats, such as other Personal Information Exchange Syntax standards.

In one embodiment, once the key generator 232 generates the key pair, the server-side key generation engine 130 sends the public key from the key generator 232 to the certificate subsystem 250 to approve the certificate enrollment request to issue the digital certificate. Operations of the CS subsystem 250 are described below. In one embodiment, the operations of the CS subsystem 250 and the operations of the server-side key generation engine 130 may be performed simultaneously, or at least concurrently. In another embodiment, the operations of the CS subsystems 250 may be performed sequentially after the operations of the server-side key generation engine 130.

In the depicted embodiment, the key delivery module 236 receives the encrypted private key (and possibly the certificate) from the key encryption module 234 and delivers the encrypted private key to the requester, such as the non-token client 102. When the key encryption module 234 encrypts the private key in an encrypted file, the key delivery module 236 delivers the encrypted file to the requester. In one embodiment, the key delivery module 236 delivers the encrypted file to the requester by sending a message to the requester with a link to a location of the encrypted file to allow the requester to retrieve the encrypted file. The message may be an email message, an instant message, or the like. The key delivery module 236 can deliver the message to the non-token client 102 using the user interface provided by the certificate manager 125, or alternatively, by a messaging system that is external to certificate manager 125 and the DRM 121, such as via a email messaging system, an instant messaging system, or the like. For example, when presenting a first user interface with the certificate enrollment request as a web page to the user of the non-token client 102, the key delivery module 236, via the servlet 252, can present a second user interface, such as another web page, including a link to a location of the encrypted file to allow the requester to retrieve the encrypted file when the enrollment request is approved. In another embodiment, the key delivery module 236 delivers the encrypted private key (e.g., encrypted file) by sending an email message to the requester with the encrypted file as an attachment to the email message. Alternatively, the key delivery module 236 can deliver the encrypted private key to the requester via a web page presented to the user via the certificate manager 125.

In another embodiment, the server-side key generation engine 130 also includes the key archival module 238. When using the key archival module 238, the key encryption module 234 can also encrypt the private key using a public storage key of a storage key pair (i.e., a public key used for encrypting the private keys 156 stored in the key repository 150 and a private key used for decrypting the private keys 156), and the key archival module 238 stores the encrypted private key in the key repository 150. The storage key pair is typically known only to the DRM 121 archiving the private keys 156. In one embodiment, the DRM 121 generates a session key to encrypt the user private key and then uses its public key to encrypt the session key and stores it with the encrypted user private key. During key recovery, DRM 121 uses its private key to decrypt the session key and then uses the session key to decrypt the user's private key. In another embodiment, the DRM can use the DRM public key to encrypt and private key to decrypt the user's private keys directly, without the extras session key. In one embodiment, the private keys 156 are stored with the corresponding public keys for retrieval purposes. Alternatively, other schemes may be used to know what private key to retrieve, such as identifier.

In one embodiment, the key archival module 238 communicates with the directory server 127 to store the encrypted private key as an LDAP entry 146 of the LDAP repository 140, for example. In the depicted embodiment, the key archival module 238 receives the private key from the key generator 232, encrypts the private key using the public storage key, and stores the encrypted private key in the key repository 150. In another embodiment, the key archival module 238 can send the encrypted private key back to the certificate manager 125 to handle archiving the encrypted key in the CA database.

In one embodiment, the certificate manager 125 provides a customizable profile framework, sometimes referred to as an enrollment profile framework, that applies policies for incoming certificate requests and controls the input request types and output certificate types using the certificate profiles. The certificate manager 125 uses the profile framework to approve and issue certificates according to the selected profile, as described in more detail below. There are two main types of certificate profiles—enrollment request profiles and renewal request profiles. Enrollment is the process for requesting and receiving an issued certificate. The mechanics for the enrollment process may depend on the type of certificate, the method for generating its key pair, and the method for generating and approving the certificate itself. Certificate enrollment, at a high level, may have the following basic steps: a user generates a certificate request and submits to the certificate system 120. The certificate system 120 verifies the request by authenticating the requesting entity and confirming that the request meets the certificate profile rules that were used to submit the request. The certificate system 120 then approves the request, and the user retrieves the new certificate. When the certificate reaches the end of its validity period (as indicated by the expiration date), the certificate system 120 can allow the expiring certificate to be renewed by receiving from a user a certificate renewal request for the certificate at the certificate manager 125. In other embodiments, the certificate system 120 may implement other types of frameworks, such as a policy-based framework that incorporates the automatic renewal module 130.

A certificate profile defines everything associated with the issuance of a particular type of certificate including the authentication method, the certificate content (defaults), constraints for values associated with that content that can be contained in this type of certificate, and the contents of the input and output forms associated with the certificate profile.

In one embodiment, a set of certificate profiles have been predefined for the most common types of certificates issued. The predefined certificate profiles define defaults and constraints commonly associated with this type of certificate, associate the authentication method common for this type of enrollment, and define the needed inputs and outputs for the certificate profile. These predefined certificate profiles can be modified by the administrator, for example, by changing the authentication method, the defaults, the constraints used in each policy, the values assigned to any of the parameters in a policy, or the input and output. The administrator can also create a certificate profile for a server-side key generation. In one embodiment, the administrator sets up a certificate profile by associating an existing authentication plug-in, or authentication method, with the certificate profile, enabling and configuring defaults and constraints, and defining inputs and outputs. The administrator can use the existing certificate profiles, modify the existing certificate profiles, create new certificate profiles, and delete any certificate profile that will not be used in this PKI.

An input specifies how the enrollment page should be presented, and what inputs should be gathered from the end-entities. The administrator can modify the certificate profiles to use inputs to add text fields to the enrollment page so that additional information can be gathered and used for the enrollment. The input values are used as values in the certificate. The administrator can use a predefined set of inputs to create an enrollment form containing the fields needed for most certificate profiles. The inputs provide a certificate request field that can be added to any of the request forms so that certificate requests can be pasted into this field, allowing a request to be created outside the input form with any of the requested information. An output specifies how the response page to a successful enrollment is presented to the requester. For example, the output usually displays the certificate in a user-readable format. Alternatively, the administrator can create other outputs.

In one embodiment, each of the certificate profiles can be listed in a certificate profile tab of an end-entity interface where an end-entity (e.g., a user) can enroll for a certificate using the certificate profile, for example, by selecting the certificate profile from the list of certificate profiles. In one embodiment, the certificate profile enrollment page contains links to each type of certificate profiles.

When an end entity, i.e., the requester, selects the link corresponding to the certificate profile for server-side key generation, the certificate manager 125, such as using a servlet 252, presents to the non-token client 102 an enrollment page containing an enrollment form specific to that certificate profile. For example, FIG. 5 illustrates an exemplary web page presented to a user by the certificate system containing a certificate enrollment form for server-side key generation according to one embodiment. The certificate manager 125 may present the web page 500 in response to the user selecting the particular type of enrollment request including a server-side key indicator, from the list of available profiles (i.e., another web page that lists the available request profiles). The web page 500 indicates the type of enrollment request that has been selected by the user and includes an enrollment request form 502 that includes an input mechanism 504, such as input field box, that allows the user to input a password for private key retrieval of the server-side generate key. The key encryption module 234 uses this password to encrypt the private key for delivery to the user, as described herein. After inputting the password, the user sends the enrollment request form 502 to the certificate manager 125, for example, by activating the submit button 506 on the enrollment request form. In one embodiment, the non-token client 102 encrypts the password using a public key of a transport key pair of the DRM 121. In another embodiment, the non-token client 102 encrypts the password using other techniques as would be appreciated by one of ordinary skill in the art having the benefit of this disclosure.

The following describes some of the operations of CS subsystem 250 in accordance with some embodiments. In the depicted embodiment, the CS subsystem 150 includes servlets 252, an authentication module 253, an authorization module 254, and a certificate issuance module 256. The CS subsystem 150 of the certificate manager 125 receive certificate requests from a requester and interacts with other components of the CS subsystem 250, as well as the DRM 121 when the enrollment request includes a server-side key indicator. The CS subsystem 150 may receive certificate requests from a registration authority (RA) requesting a certificate on behalf of a subject, from another CA requesting a cross-certificate from another CA, or directly by an user, also referred to as an end entity (EE).

In the depicted embodiment, when the CS subsystem 150 receives a certificate enrollment request from a requester of a non-token client, such as a user on the non-token client 102, the certificate manager 125 invokes a servlet 252 that interacts with other components of the CS subsystem 250 as necessary. In one embodiment, the servlet 252 may be an enrollment servlet that handles the certificate enrollment requests according to a particular certificate profile. In one embodiment, the servlet 252 processes the enrollment request for server-side key generation according to a certificate profile for server-side key generation for non-token clients. The certificate profile may specify how the key pair is to be generated and delivered to the requester by the DRM 121, as well as other criteria for approval of the certificate's enrollment. The servlet 252 uses the authentication module 253 to authenticate the user's identity. The authentication module 253 may include a set of rules (e.g., implemented as a Java™ class) for authenticating the non-token client 102 that needs to interact with the CS subsystem 150. The authentication module 253 can authenticate the certificate request using agent-based authentication, password-based authentication, certificate-based authentication, client authentication, server authentication, or the like. Once the enrollment request is authenticated and determined to include the server-side key indicator, the servlet 252 may send a key generation request to the server-side key generation engine 130 to generate the key pair for the certificate. Alternatively, the certificate manager 125 can instruct the server-side key generation engine 130 to generate the key pair using other techniques as would be appreciated by one of ordinary skill in the art having the benefit of this disclosure.

In one embodiment, once the key pair has been generated by the server-side key generation engine 130, as described above, the servlet 252 sends the certificate enrollment request with the public key to an authorization module 254, which determines whether the certificate request has been approved. In another embodiment, the key generator 232 sends the public key directly to the authorization module 254 to be submitted with the certificate enrollment request to the authorization module 254. The profile processing of the authorization module 254 determines whether to approve the certificate enrollment request, such as by determining whether the certificate request complies with the constraints of the corresponding certificate profile. When approved, the authorization module 254 sends the authorized request to a certificate issuance module 256, which issues the certificate accordingly. The profile processing of the certificate issuance module 256 issues the renewed certificate when the certificate request is approved and makes the certificate available for retrieval by a user. In one embodiment, the certificate can be encrypted with the private key generated by the key generator 232 for delivery. In such case, the key encryption module 234 receives the private key generated by the key generator 232 as well as the issued certificate. In another embodiment, the certificate manager 125 can deliver the certificate separately from the private key generated by the key generator 232. The certificate manager 125 may also publish the certificate in the LDAP repository 140 via the directory server 127, such as by storing a copy of the certificate in the LDAP repository 140. The certificate manager 125 can notify and allow the requester to download the certificate from LDAP directory, such as by providing a link to the certificate in the directory.

As described herein, typically the certificate system 120 archives encryption certificates, but does not archive signing certificates for non-repudiation purposes. In some cases, an organization, using the certificate system 120, may have a policy that the encryption certificates be renewed periodically. In such cases, it may be beneficial to implement the server-side key generation engine 130 in the DRM 121, which is implemented in the certificate system 120 to immediately archive at least the private encryption key associated with encryption certificates. The embodiments described herein may also be used for other types of certificates, such as signing certificates. Since signing certificate are typically not archived by the certificate system 120 for non-repudiation purposes, in other embodiments, the server-side key generation engine 130 can generate the private key without the archiving the private key. In other embodiments, the server-side key generation engine 130 can be implemented in other components of the certificate system 120, such as when the certificate system 120 does not use the DRM 121 for archiving. For example, in the case of signing certificates, the client typically generates the key pair and sends the public key to the CA as part of the certificate enrollment request; however, using the embodiments described herein, the server-side key generation engine 130 can generate the key pair and securely deliver the private key of the signing certificate to the non-token client 102 without archiving the private key so that only one copy of the private key exists on the non-token client 102. This may be sufficient to address the non-repudiation implications for signing certificates. In such embodiments, the server-side key generation engine 130 may be implemented in the certificate manager 125 or other components of the certificate system 120, instead of in the DRM 121. Alternatively, the digital certificates may be other types of certificates, regardless of whether these certificates need to be archived or not.

Figure 3:
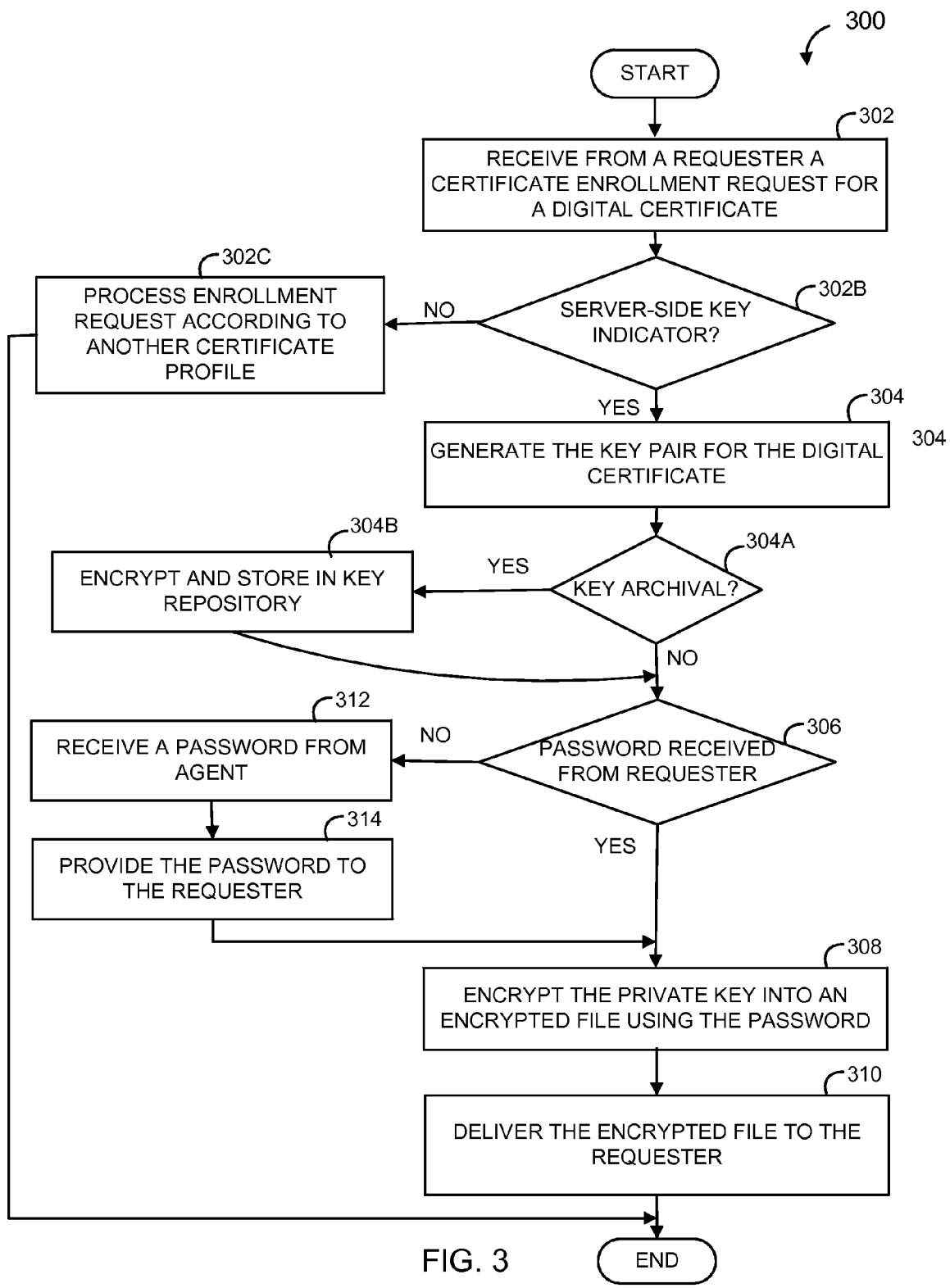
FIG. 3 is a flow diagram of one embodiment of a method of server-side key generation for non-token clients.

FIG. 3 is a flow diagram of one embodiment of a method 300 of server-side key generation for non-token clients. The method 300 is performed by processing logic that may comprise hardware (circuitry, dedicated logic, etc.), software (such as is run on a general purpose computer system or a dedicated machine), firmware (embedded software), or any combination thereof. In one embodiment, the server-side key generation engine 130 of FIGS. 1 and 2 performs the method 300. In another embodiment, the DRM 121 of FIGS. 1 and 2 performs the method 300. Alternatively, other components of the certificate system 120 can perform some or all of the operations of method 300.

Referring to FIG. 3, processing logic begins with receiving from a requester a certificate enrollment request for a digital certificate (block 302). Next, the processing logic determines if the certificate enrollment request includes a server-side key indicator (block 302B). If so, the processing logic generates the key pair for the digital certificate, including a public key and a private key (block 304), encrypts the private key into an encrypted file using a password (block 308), and delivers the encrypted file to the requester (block 310), and the method ends. Otherwise, the processing logic processes the enrollment request according to another certificate profile, for example, a certificate profile that requires that the enrollment request include a public key as part of the enrollment request (block 302C), and the method ends. In one embodiment, the server-side key indicator indicates that the enrollment request does not include a public key as part of the enrollment request and that a key pair needs to be generated by the CA (e.g., using the server-side key generation engine 130). In another embodiment, the server-side key indicator indicates that the enrollment request is received from a non-token client requesting a key pair to be generated in connection with the enrollment request. Alternatively, the server-side key indicator may indicate additional information, such as an indication as to whether the private key is to be archived by the CA, or the like.

In one embodiment, the processing logic determines whether the key pair should be archived (block 304A). If so, the processing logic encrypts and stores the key pair in the key repository and returns to block 306; otherwise, the processing logic goes straight to block 306. In one embodiment, the processing logic determines if a password is received as part of the certificate enrollment request (block 306). If the password is received from the requester, the processing logic encrypts the private key into an encrypted file using the password (block 308), and delivers the encrypted file to the requester (block 310), and the method ends. In one embodiment, the processing logic encrypts the private key in a PKCS #12 file. In another embodiment, the processing logic packages the digital certificate and the private key as a PKCS #12 package, and encrypts the PKCS #12 package with the password. Alternatively, the processing logic can encrypt the private key using other encryption techniques. If, at block 306, the password is not received, the processing logic receives a password from an agent of the CA (block 312), and provides the password to the requester (block 314) and the processing logic encrypts the private key at block 308 and delivers the encrypted private key at block 310, and the method ends. For example, if the password is not received from the requester at block 306, the processing logic may create a task to notify the CA's agent to provide a password, such as via a user interface, and to notify the requester of the password used to encrypt the private key.

In one embodiment, the processing logic receives an encrypted password that has been encrypted using a public key of a transport key pair, such as the DRM's 121 transport key pair. In this embodiment, the processing logic decrypts the encrypted password using a private key of the transport key pair. The processing logic then uses the decrypted password to encrypt the private key. In another embodiment, the processing logic presents to the requester a user interface for the certificate enrollment request on a web page, including an input field to receive a password from the requester. The processing logic receives the certificate enrollment request and the password, decrypts the password, and encrypts at least the private key of the digital certificate in an encrypted file using the decrypted password. In one embodiment, the processing logic sends the public key, after generating the key pair at block 304, to the CA to approve the certificate enrollment request that now includes the public key. The CA approves the certificate enrollment request to issue the digital certificate.

In one embodiment, the processing logic delivers the encrypted file to the requester at block 310 by sending a message to the requester with a link to a location of the encrypted file to allow the requester to retrieve the encrypted file. In another embodiment, the processing logic delivers the encrypted file to the requester at block 310 by sending an email message to the requester with the encrypted file as an attachment to the email message. Alternatively, the processing logic can deliver the encrypted private key using other mechanisms as would be appreciated by one of ordinary skill in the art having the benefit of this disclosure.

In one embodiment, the processing logic provides the password to the requester at block 314 by creating a service task to manually notify the requester of the password and notifying an agent of the certificate system of the service task to manually notify the requester of the password. The agent may notify the requester, for example, by verbally communicating the password directly to the requester. Alternatively, the agent may notify the requester using other communication means as would be appreciated by one of ordinary skill in the art having the benefit of this disclosure.

In another embodiment, the processing logic encrypts the private key using a private storage key and archives the encrypted private key in a key repository. Since the private key is generated on the server side, the processing logic can immediately archive the private key without waiting for the non-token client 102 to send the private key to the DRM 121 to be archived.

Figure 4:
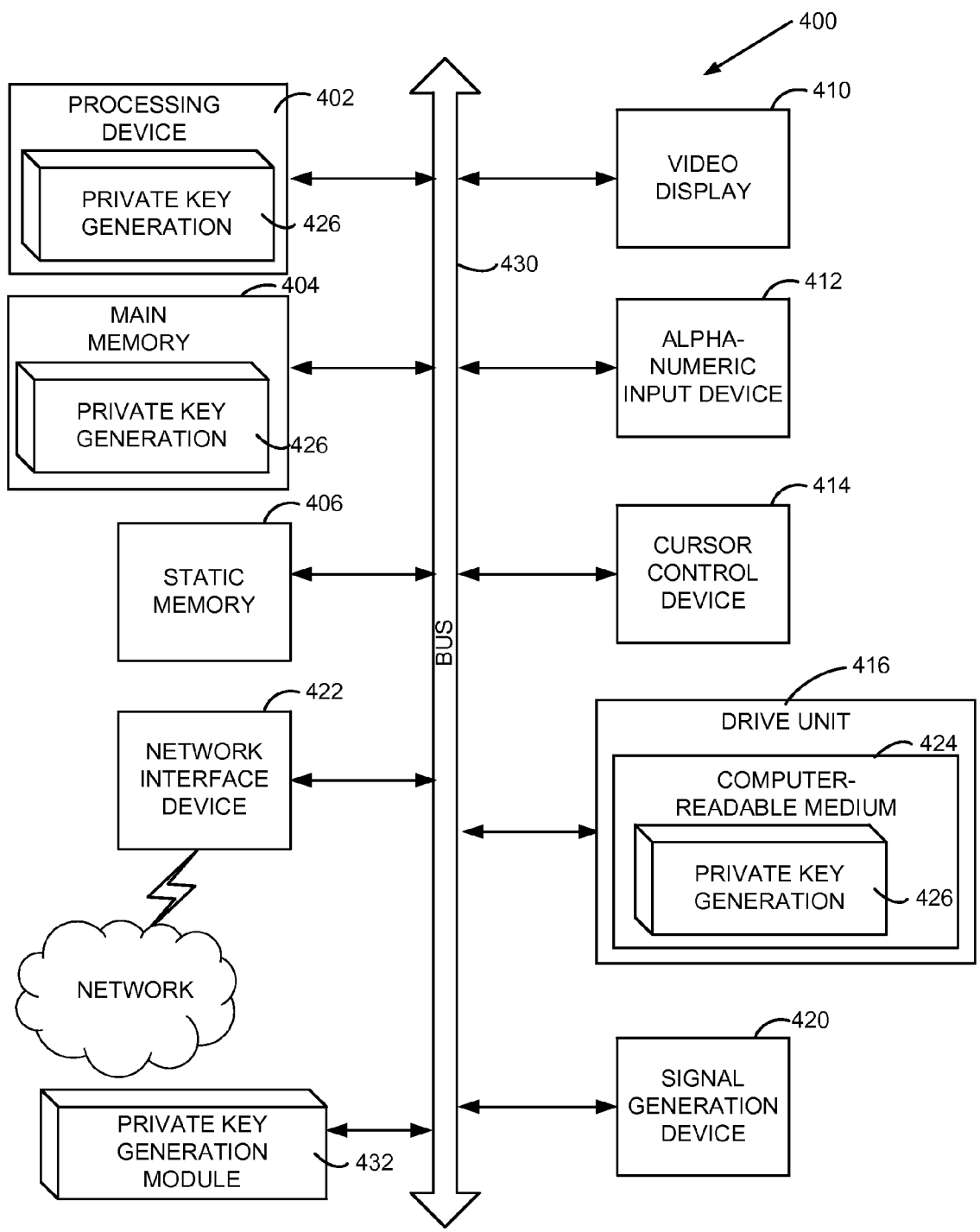
FIG. 4 illustrates a diagrammatic representation of a machine in the exemplary form of a computer system for server-side key generation for non-token clients.

FIG. 4 illustrates a diagrammatic representation of a machine in the exemplary form of a computer system 400 for server-side key generation for non-token clients. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of server-side key generation for non-token clients, such as the method 300 described above. In one embodiment, the computer system 400 represents various components that may be implemented in the certificate system 120 as described above. Alternatively, the certificate system 120 may include more or less components as illustrated in the computer system 400.

The exemplary computer system 400 includes a processing device 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., server-side key generation 426) for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., server-side key generation 426) embodying any one or more of the methodologies or functions described herein. The server-side key generation 426 may also reside, completely or at least partially, within the main memory 404 and/or within the processing device 402 during execution thereof by the computer system 400, the main memory 404 and the processing device 402 also constituting computer-readable storage media. The server-side key generation 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The server-side key generation module 432, components, and other features described herein (for example in relation to FIGS. 1 and 2) can be implemented as discrete hardware components or integrated in the functionality of hardware components such as ASICS, FPGAs, DSPs or similar devices. In addition, the server-side key generation module 432 can be implemented as firmware or functional circuitry within hardware devices. Further, the server-side key generation module 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method, comprising:
   receiving, at a certificate manager of a computing system from a requester, a certificate enrollment request for a digital certificate for a non-token client, the digital certificate of the non-token client comprising a soft token that does not employ a hardware security device;
   determining that the certificate enrollment request includes a server-side key indicator to generate a transport key pair, including a public key and a private key, for the digital certificate;
   generating the transport key pair for the digital certificate for the non-token client with the soft token by a server-side key generation engine of the computing system when the certificate enrollment request includes the server-side key indicator;
   receiving a password from the requester as part of the certificate enrollment request;
   encrypting the certificate enrollment request including the password with the public key of the transport key pair;
   encrypting the private key by the server-side key generation engine; and
   delivering the encrypted private key to the requester.

2. The method of claim 1, further comprising:
   encrypting the private key in an encrypted file using the password by the server-side key generation engine, wherein said delivering comprises delivering the encrypted file to the requester.

3. The method of claim 2, wherein the method further comprises decrypting the encrypted password by the server-side key generation engine using a private key of the transport key pair.

4. The method of claim 2, wherein the encrypted file is a Public Key Cryptography Standard (PKCS) #12 file.

5. The method of claim 2, wherein said encrypting the private key in the encrypted file further comprises encrypting the digital certificate with the private key in the encrypted file.

6. The method of claim 2, further comprising sending a message to the requester with a link to a location of the encrypted file to allow the requester to retrieve the encrypted file.

7. The method of claim 2, further comprising sending an email message to the requester with the encrypted file as an attachment to the email message.

8. The method of claim 1, further comprising:
   identifying a server-side key generation certificate profile of the computing system when the certificate enrollment request includes the server-side key indicator; and
   processing the certificate enrollment request according to the server-side key generation certificate profile when the certificate enrollment request includes the server-side key indicator.

9. The method of claim 1, further comprising:
   presenting to the requester a user interface for the certificate enrollment request on a web page, wherein the user interface comprises an input field to receive a password from the requester;
   receiving the certificate enrollment request and the password from the requester, wherein at least the password of the certificate enrollment request is encrypted using a public key of a transport key pair;
   decrypting the password by the server-side key generation engine using a private key of the transport key pair;
   approving, by the certificate manager, the certificate enrollment request to issue the digital certificate; and
   encrypting at least the private key of the digital certificate in an encrypted file using the decrypted password, wherein said delivering comprises delivering the encrypted file to the requester.

10. The method of claim 9, further comprising presenting a second user interface comprising a link to a location of the encrypted file to allow the requester to retrieve the encrypted file when the certificate enrollment request is approved.

11. The method of claim 9, further comprising sending an email message to the requester with the encrypted file as an attachment when the certificate enrollment request is approved.

12. The method of claim 9, further comprising:
    encrypting the private key using a private storage key by the server-side key generation engine; and
    archiving the private key in a key repository.

13. The method of claim 1, further comprising:
    receiving a password from an administrator of the computing system;
    encrypting the private key in an encrypted file using the password by the server-side key generation engine, wherein said delivering comprises delivering the encrypted file to the requester; and
    providing the password generated by the computing system.

14. The method of claim 13, wherein said providing the password comprises:
    creating a service task to manually notify the requester of the password; and
    notifying an agent of the certificate system of the service task to manually notify the requester of the password.

15. A certificate system, comprising:
    a data storage device to store data concerning key pairs of digital certificates issued by a certificate authority (CA);
    a certificate manager, coupled to the data storage device, to receive from a requester a certificate enrollment request for a digital certificate for a non-token client, the digital certificate of the non-token client comprising a soft token that does not employ a hardware security device, and to determine that the certificate enrollment request includes a server-side key indicator to generate a transport key pair, including a public key and a private key, for the digital certificate for the non-token client with the soft token; and
    a server-side key generation engine, coupled to the certificate manager, to generate the transport key pair for the digital certificate when the certificate enrollment request includes the server-side key indicator, to receive a password from the requester as part of the certificate enrollment request, to encrypt the certificate enrollment request including the password with the public key of the transport key pair, and to deliver the digital certificate and key pair to the requester.

16. The certificate system of claim 15, wherein the server-side key generation engine comprises:
    a key generator to generate the key pair;
    a key encryption module, coupled to the key generator, to encrypt the private key; and
    a key delivery module, coupled to the key encryption module, to deliver the encrypted private key to the requester.

17. The certificate system of claim 16, wherein the server-side key generation engine further comprises a key archival module, coupled to the key encryption module, to archive the private key in the data storage device, and wherein the key encryption module is to encrypt the private key using a private storage key and archive the encrypted private key in a key repository.

18. The certificate system of claim 16, wherein the key encryption module is to decrypt the password if encrypted, and encrypt the private key in an encrypted file using the password, and wherein the key delivery module is to deliver the encrypted file to the requester.

19. A non-transitory machine-readable storage medium having instructions, which when executed, cause a computing system to perform operations, comprising:
   receiving, at a certificate manager of the computing system from a requester, a certificate enrollment request for a digital certificate for a non-token client, the digital certificate of the non-token client comprising a soft token that does not employ a hardware security device;
   determining that certificate enrollment request includes a server-side key indicator to generate a transport key pair, including a public key and a private key, for the digital certificate;
   generating the transport key pair for the digital certificate for the non-token client with the soft token by a server-side key generation engine of the computing system when the certificate enrollment request includes the server-side key indicator;
   receiving a password from the requester as part of the certificate enrollment request;
   encrypting the certificate enrollment request including the password with the public key of the transport key pair;
   encrypting the private key by the server-side key generation engine; and
   delivering the encrypted private key to the requester.

20. The non-transitory machine-readable storage medium of claim 19, further comprising:
   encrypting the private key in an encrypted file using the password by the server-side key generation engine, wherein said delivering comprises delivering the encrypted file to the requester.

21. The non-transitory machine-readable storage medium of claim 20, wherein said receiving the password from the requester comprises receiving an encrypted password that has been encrypted using a transport key, and wherein the operations further comprise decrypting the encrypted password by the server-side key generation engine using the transport key.

22. The non-transitory machine-readable storage medium of claim 19, further comprising:
   presenting to the requester a user interface for the certificate enrollment request on a web page, wherein the user interface comprises an input field to receive a password from the requester;
   receiving the certificate enrollment request and the password from the requester, wherein at least the password of the certificate enrollment request is encrypted using a transport key;
   decrypting the password by the server-side key generation engine;
   approving, by the certificate manager, the certificate enrollment request to issue the digital certificate; and
   encrypting at least the private key of the digital certificate in an encrypted file using the decrypted password, wherein said delivering comprises delivering the encrypted file to the requester.

* * * * *